United States Patent [19]

Jona

[11] Patent Number: 4,682,514
[45] Date of Patent: Jul. 28, 1987

[54] TOE CLIP FOR BICYCLE PEDALS

[75] Inventor: Mario Jona, Rubano, Italy

[73] Assignee: Campagnolo S.p.A., Rubano, Italy

[21] Appl. No.: 873,140

[22] Filed: Jun. 9, 1986

Related U.S. Application Data

[63] Continuation of Ser. No. 663,683, Oct. 18, 1984, abandoned.

[30] Foreign Application Priority Data

Oct. 28, 1983 [IT] Italy .............................. 23406/83[U]

[51] Int. Cl.$^4$ ............................................. G05G 1/14
[52] U.S. Cl. .................................................. 74/594.6
[58] Field of Search ................. 74/594.6, 594.4, 594.1, 74/594.2, 594.5, 594.3, 560, 563, 594.7; 280/11.3, 11.31, 11.32, 11.33, 11.34, 613, 617–620; 36/117, 120, 122, 131, 132

[56] References Cited

U.S. PATENT DOCUMENTS

| | | | |
|---|---|---|---|
| 613,957 | 11/1898 | Ashworth | 74/594.6 |
| 625,156 | 5/1899 | Duffy | 74/594.6 |
| 1,202,451 | 10/1916 | Stern | 36/132 |
| 2,006,802 | 7/1935 | Goodman | 36/132 |
| 4,172,392 | 10/1979 | Foster | 74/594.6 |

FOREIGN PATENT DOCUMENTS

| | | | |
|---|---|---|---|
| 558880 | 9/1923 | France | 74/594.6 |
| 832883 | 10/1938 | France | 74/594.7 |
| 877480 | 12/1942 | France | 74/594.6 |
| 1011888 | 7/1952 | France | 74/594.6 |
| 2500658 | 8/1982 | France | 74/594.6 |
| 457668 | 12/1936 | United Kingdom | 74/594.6 |
| 458949 | 12/1936 | United Kingdom | 74/594.6 |

Primary Examiner—Gary L. Smith
Assistant Examiner—Vinh Luong
Attorney, Agent, or Firm—Young & Thompson

[57] ABSTRACT

A toe clip for bicycle pedals comprises a flexible metal lamina fixed on one side of the pedal cage, which lamina extends first forward and outwardly and then folds backward to envelop the shoe point, onto which it presses in correspondence of the foot neck by way of a strap. The folded portion of the flexible lamina ends with two eyelets for the strap, placed at a certain mutual distance.

1 Claim, 2 Drawing Figures

TOE CLIP FOR BICYCLE PEDALS

This application is a continuation of application Ser. No. 663,683, filed 10/18/84, abandoned.

BACKGROUND OF THE INVENTION

1. Field of the Invention

The present invention relates to a toe clip for bicycle pedals, having an improved structure which provides notable advantages from the functional point of view and guarantees to the cyclist great comfort in use.

As known, toe clips are simple devices used on sports and racing bicycles to fix the cyclist's feet on the pedals in the most appropriate position. They consist of a flexible metal lamina, extending from one of the long sides of the pedal cage, first in the forward direction and outwardly, and the folding backward to envelop the shoe point, onto which it presses in correspondence of the foot neck by way of a leather cross-strap, which is fixed to the other side of the pedal and has a buckle.

2. Description of the Prior Art

At present, in all the known toe clips, the above flexible lamina is formed with its strongly tapered—substantially triangular—folded part ending in a single eyelet, which is traversed by the strap. In this way, the strap pull practically concentrates only on one point of the shoe, and thus of the cyclist's foot, in correspondence of the first metatarsus; this always causes strain and often a pain, which compromise the efficiency and performance of the cyclist.

SUMMARY OF THE INVENTION

The object of the present invention is to eliminate this drawback by providing an improved toe clip, characterized in that the folded portion of the flexible lamina forming said clip ends with two eyelets for the strap, placed at a certain mutual distance.

Suitably, the folded portion of the flexible lamina forming the toe clip has a shaped configuration—for instance, it is first inclined to reduce its width and then it widens again in the form of an X—and can comprise lightening slots.

BRIEF DESCRIPTION OF THE DRAWINGS

The invention is illustrated in the accompanying drawings, wherein.

DETAILED DESCRIPTION OF THE PREFERRED EMBODIMENT

Figure 1:
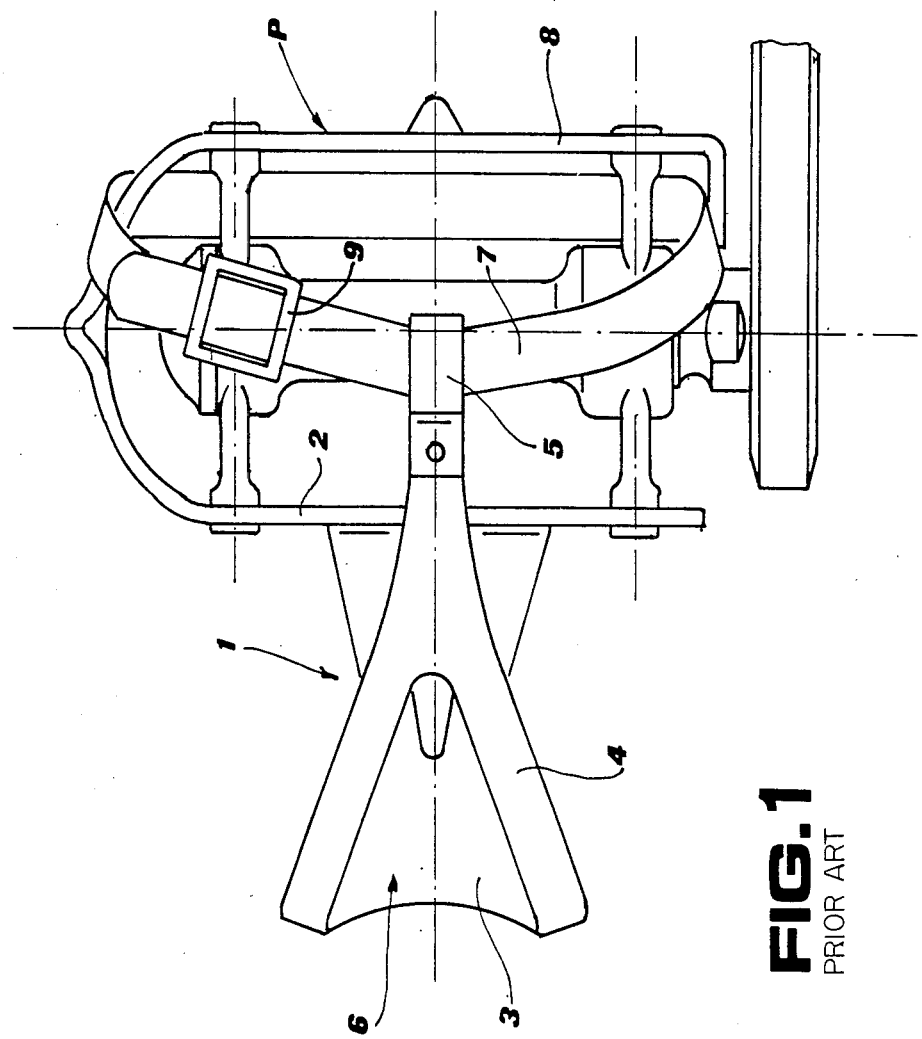
FIG. 1 shows a top view of a conventional type toe clip.

With reference to the drawings, it can be seen how the conventional toe clip of FIG. 1 is formed of a flexible metal lamina 1, extending from one of the sides 2 of the pedal cage P (to which it is screwed) first in the forward direction 3 and outwardly, and then folding backward at 4 and tapering, to end into an eyelet 5. Reference 6 indicates a lightening of the lamina 1 in its folded portion 4, and reference 7 the strap for applying the toe clip on the cyclist's foot, which strap is carried by the pedal close to its other side 8 and is inserted into the eyelet 5 of the toe clip. A buckle 9 allows locking the strap onto the shoe and thus onto the cyclist's foot, which is thereby held between the pedal P and the toe clip.

As already said, in this way the pull of the strap is practically concentrated only on one point of the shoe, and thus of the cyclist's foot, in correspondence of the first metatarsus; this always causes strain and often a pain, which compromise the efficiency and performance of the cyclist.

Figure 2:
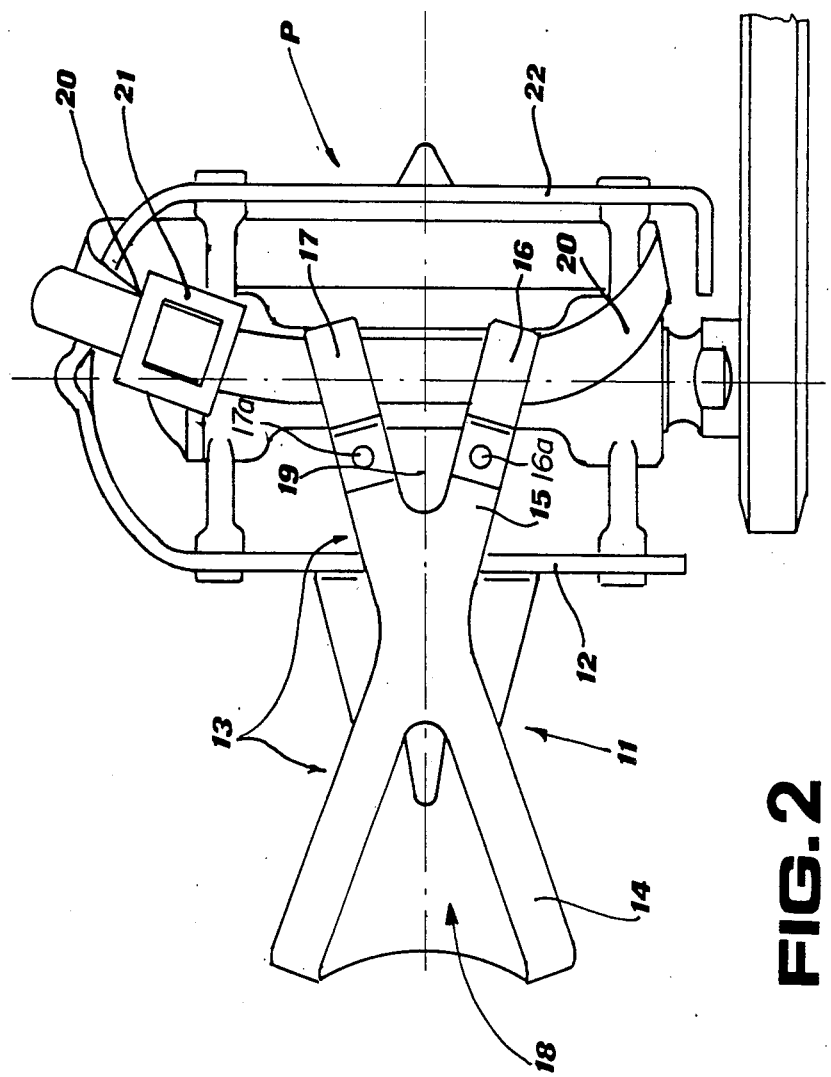
FIG. 2 shows a top view of a toe clip according to the present invention.

This fully avoided by the arrangement of FIG. 2, wherein the flexible metal lamina 11 forming the toe clip, extends from the side 12 of the pedal P with its folded portion 13 shaped so as to have a first narrowing section 14, followed by a second widening section 15. In other words, it takes up a substantially X-shaped configuration, ending with two eyelets 16 and 17 placed at a certain mutual distance, instead of the single eyelet 5 (FIG. 1) of the traditional toe clips. As will be evident from FIG. 2, each eyelet is disposed at the rear end of a respective one of the rearwardly extending legs that comprise section 15, and extends along only a rear portion of the length of its associated rearwardly extending leg. Each eyelet 16, 17 is closed at its forward end by a separate fastener 16a, 17a, respectively, that is disposed intermediate the length of the associated rearwardly extending leg. Lightening slots 18 and 19 favour the X configuration of the folded portion 13 of the toe clip according to the invention, but evidently this could also be shaped differently from how it appears in the embodiment shown. It should be noted, instead, that the two eyelets 16 and 17 must be positioned substantially symmetrical in respect of the longitudinal axis of the toe clip. Obviously, both these eyelets are traversed by the fixing strap 20, of which can be seen the buckle 21, which strap is also in this case carried by the pedal cage P, close to its side 22 opposite to the side 12.

With this arrangement, the pulling force of the strap 20 is evenly distributed along the length included between the two eyelets 16 and 17, and it is not concentrated in one point only, against the shoe and the cyclist's foot.

This considerably reduces weariness of the foot, which acts on the pedals even for a long time; it prevents pains in said foot and it therefore appreciably improves the efficiency and performance of the cyclist, which can at times be of decisive importance in the case of first-class competitions.

A further advantage provided by the solution according to the invention is the greater easiness for the cyclist in fitting on the toe clip: in fact, the strap 20 remains constantly stretched between the two eyelets 16 and 17, leaving a wide free space for the cyclist's foot and shoe to settle in its place into the toe clip on the pedal P. Experience has proved, in fact, that with the traditional toe clips, a cyclist who has set his foot on the ground or who has had to disengage his foot to avoid a fall, has to waste an often considerable amount of time to fit his foot back into the toe clip, because of having to widen the strap with his hands.

Now, with the toe clip according to the invention, this waste of time is practically eliminated, even in the most unfavourable conditions.

I claim:

1. A toe clip for bicycle pedals, comprising a flexible metal lamina adapted to be fixed on one side of a bicycle pedal cage, said lamina extending first forward and outwardly and then having a portion extending backwardly, the backwardly extending portion of the lamina ending in two spaced-apart eyelets, and a flexible strap extending through said eyelets, said backwardly extending portion of the lamina having a substantially X- shaped configuration comprised by two forwardly extending legs that diverge forwardly from each other and two rearwardly extending legs that diverge rearwardly from each other, each said eyelet being disposed at the rear end of a respective one of said rearwardly extending legs and extending along only a rear portion of the length of its associated said rearwardly extending leg, each said eyelet being closed at its forward end by a separate fastener that is disposed intermediate the length of the associated said rearwardly extending leg.

* * * * *